Sept. 21, 1965 J. C. KUCKHOFF 3,207,470
SPRING BIASED PIVOTED TERMINAL GATE VALVE
Filed June 12, 1962
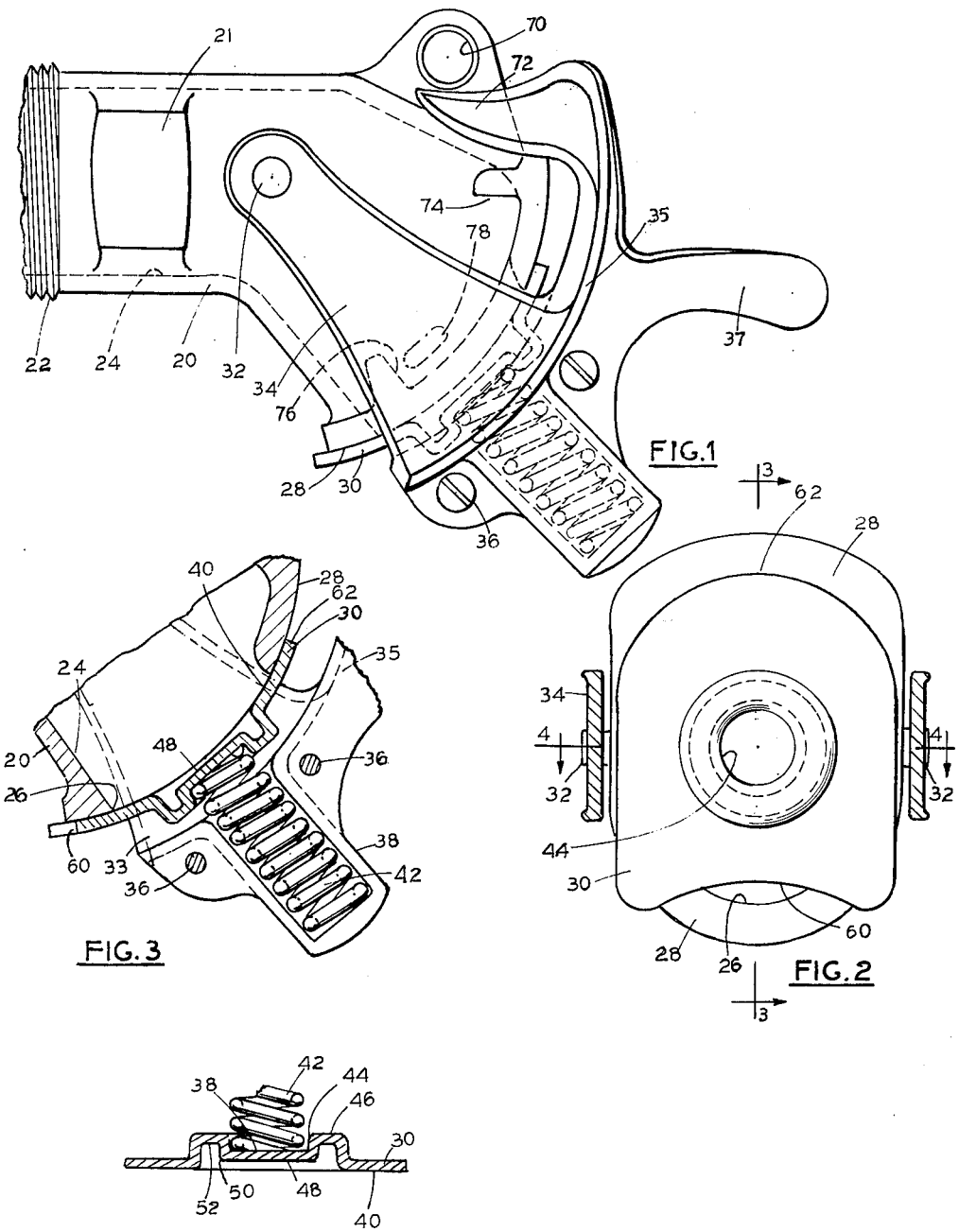
INVENTOR.
JOHN C. KUCKHOFF
BY
ATTORNEY 3,207,470
SPRING BIASED PIVOTED TERMINAL
GATE VALVE
John Carl Kuckhoff, Syracuse, N.Y.; Carl J. Kuckhoff, Sr., Arthur W. Wilson, Sr., and Merchants National Bank & Trust Company of Syracuse, executors of the estate of said John Carl Kuckhoff, deceased, assignor to The Syracuse Stamping Company, Inc., Syracuse, N.Y., a corporation of New York
Filed June 12, 1962, Ser. No. 201,885
2 Claims. (Cl. 251—179)

This invention relates to gate faucets of the free flowing type employed for oil, molasses and the like, and more particularly to the valve slides employed in such gate faucets.

Gate faucets having a substantially circular discharge orifice terminating in an arcuate seat surface to which is applied an arcuate valve slide to close the orifice, and in which the slide is held against the surface under a heavy compression spring have been in common use for many years. The valve slide of such faucets are moved from an orifice covering position to an open position, by a valve operating lever or handle pivoted on the valve body on an axis coincident with the radius of the arcuate seat surface. It has long been the practice, in such valves to cast the slide thereof of brass the cost of which is excessive. In such valves the operating lever or handle includes as a part thereof a radial outwardly extending socket to receive a compression spring which bears centrally upon the slide, and the cast slide has been provided centrally thereof with a radially outwardly extending integral stud or projection adapted to extend into the inward end of the coil spring to center the coil spring on the slide, so that upon angular motion of the valve handle, such motion is transmitted through the spring to the valve slide for opening and closing the valve. To avoid the expense of a cast slide, various attempts have been made in the past to form the slide from heavy gage sheet material such as brass and the like and to form the spring centering projection by drawing the projection from the sheet metal from which the slide would be formed. The drawing out of the metal in such manner, in an attempt to form a projection of adequate length, and yet small enough to enter the convolutions of the spring resulted in thinning the metal, and stressing the metal to such an extent as to result in defective slides with incipient cracks resulting in substantial spoilage in manufacture, and leakage through the valve slide when such cracks escaped notice during manufacture or subsequently developed during use. Since such valves are often employed for discharge of inflammable liquids, any leakage may be serious.

The present invention is directed to the formation of a valve slide from heavy sheet or strip metal stock, without resort to the projection attempted heretofore, and more particularly the invention has to do with the formation of such a slide in a progressive die operation wherein the heavy sheet metal is formed to provide a circular socket for the inner end of the compression spring, and in which the formation of such socket does not thin the metal appreciably, or unduly stress the metal, and in which the annular upset metal forming the socket acts as an annular strengthening and stiffening rib or ridge, with the result that a slide of improved rigidity is formed from inexpensive sheet or strip material in a relatively economical progressive die operation. Thus the expense of a cast part is eliminated.

The above and other features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a side elevational view of a gate faucet having the valve slide of the present invention;

FIGURE 2 is an end view of the valve showing the discharge opening partially closed by the slide of the present invention, and with the operating handle cut away;

FIGURE 3 is a sectional view taken substantially on the line 3—3 of FIGURE 2, but with the valve in closed position;

FIGURE 4 is a section through the valve slide taken on the line 4—4 of FIGURE 3.

Referring to the drawings, the main hollow body portion of the faucet which may be of cast iron or other suitable material is indicated at 20. A pipe attachment thread 22 at one end is provided exteriorly thereof and wrench flats 21 are also provided. A through passage is indicated at 24, such passage terminating in a substantially circular discharge orifice 26 in the arcuate external cylindrical end surface 28, forming the seat for the valve slide 30. Pivotally mounted on trunnions 32 on either side of the valve body is a U-shaped lever having spaced arms 33, 34 and having an arcuate shell 35 overlying the valve seat. The lever has an integral handle 37, and a spring socket 38. The lever may be cast or otherwise formed of two parts, the left and right hand parts dividing on a central plane lying transversely of the axis of the trunnions 32. The left hand and right hand parts are secured together as by screws 36. The axis of the trunnions is concentric with the radius of the arcuate valve seat surface 28.

A valve slide 30, having an arcuate inner face 40, matching that of the arcuate seat surface 28 and of a width and length substantially greater than the diameter of the orifice 26 is provided. The valve slide is urged against the arcuate seat under heavy pressure by a compression spring 42 which bears upon the backside of the slide, and extends into the slide carrying lever handle socket 38.

In order to center the inner end of the spring on the back face of the valve slide, a circular flat bottom spring socket 44 surrounded by an annular ridge or rib of metal 46 deformed from the sheet metal of the slide is provided. Such socket coacts with the spring so that the slide is moved or carried circumferentially on the seat upon angular movement of the valve handle, and the socket is of sufficient depth as to assure the spring end against escape therefrom. The lower end of the valve slide is inwardly curved as at 60 to cooperate with the orifice to provide an oval or rounded discharge outlet for smooth flow on partial or full discharge, and is rounded at the other end as at 62, on an arc substantially concentric with the spring socket.

The annular ridge or rib is of lesser diameter than the diameter of the outlet orifice of the valve, and the valve slide, when in closed position is so disposed as to place the annular ridge concentric with the circular outlet orifice. The annular ridge, and the bottom portion of the socket, on the valve seat side, is disposed radially outwardly slightly from the seat as at 48, and the internal U section annulus 50 of metal forming the socket wall and annular rib, and the annular groove 52 inside formed thereby is such as to render to the valve slide, though made of sheet metal, the rigidity of relatively heavy expensive cast slides.

The valve slide is preferably formed of heavy strip sheet metal stock such as steel or brass. In a progressive die operation, the metal forming the annular ridge may be first pressed outwardly to form a somewhat hemispherical or domeshaped draw, and the center thereof is subsequently formed inwardly to form the flat bottom circular pocket. Such operations may be formed while the material is in flat strip or ribbon form, following which the strip may be severed into individual flat blanks having the annular ridge formed pocket therein. The inwardly curved arcuate end 60 and the circular end 62, by reason of the somewhat complemental curvature, avoid wastage of metal on severing successive blanks from the strip sheet stock. The severed blanks are thereafter coined to the arcuate shape as shown to provide a true cylindrical face. Subsequently each slide is lapped in upon a valve body seat surface, which has previously been machined to provide a cylindrical seat surface concentric with the trunnions, and corresponding to that of the slide, so as to mate therewith.

Suitable stops 74 and 76, cast in the side of the body coact with an integral lug 78 on the inside of one or both of the arms 33 and 34, to limit angular movement between a fully closed position and a wide open position, and an inwardly extending horn 72 on each of the left and right hand arm parts of the lever handle form a fork surrounding a heavy fin 71, integral with the body when the valve is closed, so that a padlock disposed in the aperture 70 prevents opening of the valve.

Assembly of the parts should be readily understood from the foregoing. Once a slide has been lapped so as to mate with a valve body seat, the arms and a spring are assembled, and the valve completed. While reference to sheet, brass or steel has been made, it should be evident that any sheet material capable of being worked in the manner described may be employed to form the slide, and the rigidifying annular rib which forms the socket. The material employed may be selected for its properties to withstand the corrosive action of any particular liquid.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the lmits of the invention.

A divisional application directed to the method of making the slide has been filed on January 31, 1963, under Serial Number 255,243.

What is claimed is:

1. A gate faucet comprising a body member having a passage therethrough terminating in a discharge orifice at one end, an arcuate valve slide seat formed on the end of said body portion, a pair of trunnions on opposite sides of the valve body disposed on an axis coincident with the axis of said seat, a slide formed of a single piece of sheet metal having an arcuate surface mating with said seat and disposed in sliding relation thereon, a valve operating lever embracing the end of said body portion and having arms pivoted on said trunnions, a spring socket in said lever radially disposed and facing inwardly with respect to said axis, and an outwardly facing socket disposed centrally of said slide and surrounded by an annular outwardly extending U sectioned rib of an outer diameter not greater than the orifice and an inner diameter substantially corresponding with the diameter of the spring socket, and with the rim thereof adjacent the open end of the spring socket, and a compression spring having its opposed ends seated within said lever socket and slide socket respectively and adapted to hold the slide on its seat under pressure and move the slide on its seat with angular motion of the lever about the trunnion axis to open and close the orifice.

2. A gate faucet comprising a body member having a passage therethrough terminating in a discharge orifice at one end, an arcuate cylindrical valve slide seat formed on the end of said body portion, a pair of trunnions on opposite sides of the valve body disposed on an axis coincident with the axis of said seat, a slide formed of a single piece of sheet metal having a cylindrical surface mating with said valve slide seat and said slide surface being lapped, a valve operating lever embracing the end of said body portion and having arms pivoted on said trunnions, a spring socket in said lever radially disposed and facing inwardly with respect to said axis, and an outwardly facing socket having a circular substantially flat bottom wall disposed centrally of said slide and having an annular surrounding outwardly extending U sectioned rib of an outer diameter not greater than the orifice and an inner diameter substantially corresponding with the diameter of the spring socket, and with the rim thereof adjacent the open end of the spring socket, said socket being offset inwardly slightly from said cylindrical surface and a compression spring having its opposed ends seated within said lever socket and slide socket respectfully and adapted to hold the slide on its seat under pressure and move the slide on its seat with angular motion of the lever about its trunnion axis.

References Cited by the Examiner
UNITED STATES PATENTS

| 1,164,556 | 12/15 | Stearns | 251—179 |
| 1,977,234 | 10/34 | Kuckhoff | 251—179 |
| 2,455,299 | 11/48 | Cooley | 29—156.7 |
| 2,471,948 | 5/49 | Gibian et al. | 29—156.7 |
| 2,521,201 | 9/50 | Clark et al. | 137—540 XR |

ISADOR WEIL, *Primary Examiner.*

M. CARY NELSON, *Examiner.*